United States Patent [19]

Bouboulis et al.

[11] Patent Number: 4,501,868

[45] Date of Patent: Feb. 26, 1985

[54] SUPERIOR SOLVENT BLENDS FOR SYNTHESIS OF ACRYLIC RESINS FOR HIGH SOLIDS COATINGS

[75] Inventors: Constantine J. Bouboulis, Union; Irving Kuntz, Linden, both of N.J.

[73] Assignee: Exxon Research & Engineering Co., Florham Park, N.J.

[21] Appl. No.: 393,080

[22] Filed: Jun. 28, 1982

[51] Int. Cl.³ .................. C08F 2/06; C08F 220/20
[52] U.S. Cl. .................. 526/208; 524/365; 526/293; 526/320; 560/205
[58] Field of Search .............. 526/208, 320; 524/365; 560/205

[56] References Cited

U.S. PATENT DOCUMENTS

| | | | |
|---|---|---|---|
| 3,005,796 | 10/1961 | Dreisbach et al. | 524/365 |
| 3,271,375 | 9/1966 | Delacretaz et al. | 526/204 |
| 3,304,280 | 2/1967 | Senior | 524/365 |
| 4,075,242 | 2/1978 | Rhum et al. | 560/190 |
| 4,276,212 | 6/1981 | Khanna et al. | 260/39 |
| 4,369,296 | 1/1983 | Podszun et al. | 524/369 |

FOREIGN PATENT DOCUMENTS 27719 10/1980 European Pat. Off.
29339 11/1980 European Pat. Off.
29594 11/1980 European Pat. Off.
29683 11/1980 European Pat. Off.

OTHER PUBLICATIONS

DG-1P Data Sheet, Aromatic 100 and 150, issued by Exxon Corporation, May 20, 1977, (2 pp.).
D. Rum et al., "Acrylic Co-polymer Oligomers for High Solids Coating Resins", *Journal of Coatings Technology*, vol. 55, No. 703, pp. 75-79, (Aug. 1983), (p. 76, col. 1).

*Primary Examiner*—Harry Wong, Jr.
*Attorney, Agent, or Firm*—Jack B. Murray, Jr.

[57] ABSTRACT

According to the present invention, an improved method for providing acrylic copolymer resins is provided in which the polymerization solvent comprises a blend of methyl isobutyl ketone and certain alkyl-substituted benzene solvents. The monomers comprise hydroxy-substituted alkyl (meth)acrylate monomers and non-hydroxy substituted alkyl (meth)acrylate monomers, and the process provides an improved method for forming low molecular weight acrylic resins useful as components in acrylic coatings. The polymerization solvent can remain in the resin to become a solvent employed in the higher solids coating containing the thus-formed acrylic resins and provides improved electrical resistivity, improved solvency and decreased surface tensions over prior art polymerization solvents.

12 Claims, No Drawings

SUPERIOR SOLVENT BLENDS FOR SYNTHESIS OF ACRYLIC RESINS FOR HIGH SOLIDS COATINGS

BACKGROUND OF THE INVENTION

1. Field of the Invention

This invention relates generally to a process for making acrylic coating resins and more specifically to superior solvent blends useful in the synthesis of acrylic high solids coating resins.

2. Description of the Prior Art

A large variety of acrylic coating compositions are known. Low solids coatings, i.e., those containing about 18 to 40 wt.% solids and the balance solvents, have heretofore been developed in which the resins themselves are characterized by high molecular weights, e.g., molecular weights in the range of 20,000 to 40,000. Such high solvent concentrations are required with these high molecular weight resins in order to supply flowability and other properties necessary for ease in applying a uniform coating. Due to strict air pollution regulations, pollution abatement of solvents is of paramount importance. To this end, the industry has expended much effort in attempting to develop high solids coatings, that is, coatings having low molecular weight resins (e.g., from about 1,000 to 6,000 molecular weight) in order to reduce the amount of solvents necessary in the blend for coating applications and, hence, the pollution difficulties associated with the solvents themselves. These high solids acrylic coatings are useful as exterior finish for automobiles, trucks, airplanes and as an appliance finish.

Illustrative of prior art, high solids acrylic resins are those disclosed in U.S. Pat. No. 4,276,212 and in European patent application Nos. 27,719; 29,339; 29,594 and 29,683.

The prior art has employed a variety of solvents in the preparation of their high solids coatings and it is desirable to employ the same solvent both as the polymerization solvent and as the coating solvent to avoid the need to remove a polymerization solvent before formulating the high solids coatings from a polymerized resin.

Solvents which are indicated to be typical in these references (e.g., those mentioned in European patent application No. 29,594) are: toluene, xylene, butyl acetate, acetone, methyl isobutyl ketone, methyl amyl ketone, methyl ethyl ketone, butyl alcohol and other aliphatic, cycloaliphatic and aromatic hydrocarbons, esters, ethers, ketones, and alcohols.

SUMMARY OF THE INVENTION

According to the present invention, an improved method for preparing acrylic copolymer resins is provided in which the polymerization solvent comprises a blend of methyl isobutyl ketone and certain alkyl-substituted benzene solvents. The monomers comprise hydroxy-substituted alkyl(meth)acrylates, and non-hydroxy substituted alkyl(meth)acrylates, and the process provides an improved method for forming low molecular weight acrylic resins useful as components in acrylic coatings. The polymerization solvent can remain in the resin to become the solvent employed in the higher solids coating containing the thus-formed acrylic resins and provide improved electrical resistivity, improved solvency and decreased surface tensions over prior art polymerization solvents.

In addition, the solvent blends of this invention provide the low-molecular weight acrylic resins at lower reflux temperatures which give significant process advantages, among them lower energy requirements and ease of pollution control. Surprisingly, the solvent blend of this invention produces low molecular weight acrylic copolymers which are characterized by superior molecular weight and viscosity properties, and are therefore especially suited for use in high solids coatings.

DETAILED DESCRIPTION OF THE INVENTION

According to the improved process of this invention, acrylic polymers are prepared by contacting under polymerizing conditions a hydroxy-substituted alkyl(meth)acrylate and a non-hydroxy substituted alkyl(meth)acrylate in the presence of a free radical polymerization catalyst and a polymerization solvent comprising from about 35 to 80 wt.% methyl isobutyl ketone and the balance an aromatic solvent containing as a majority component an alkyl-substituted benzene in which the alkyl substituent(s) comprise a total of at least 2 carbon atoms when the benzene ring is mono-alkyl substituted and of at least 3 carbon atoms when the benzene ring is substituted by two or more alkyl groups.

The hydroxy-substituted alkyl(meth)acrylates which can be employed comprise members selected from the group consisting of the following esters of acrylic or methacrylic acid and aliphatic glycols: 2-hydroxy ethyl acrylate; 3-chloro-2-hydroxypropyl acrylate; 2-hydroxy-1-methylethyl acrylate; 2-hydroxypropyl acrylate; 3-hydroxypropyl acrylate; 2,3-dihydroxypropyl acrylate; 2,3-dihydroxypropyl acrylate; 2-hydroxybutyl acrylate; 4-hydroxybutyl acrylate; diethyleneglycol acrylate; 5-hydroxypentyl acrylate; 6-hydroxyhexyl acrylate; triethyleneglycol acrylate; 7-hydroxyheptyl acrylate 2-hydroxy-1-methylethyl methacrylate; 2-hydroxypropyl methacrylate; 3-hydroxypropyl methacrylate; 2,3-dihydroxypropyl methacrylate; 2-hydroxybutyl methacrylate; 4-hydroxybutyl methacrylate; 3,4-dihydroxybutyl methacrylate; 5-hydroxypentyl methacrylate; 6-hydroxyhexyl methacrylate; 1,3-dimethyl-3-hydroxybutyl methacrylate; 5,6-dihydroxyhexyl methacrylate; and 7-hydroxyheptyl methacrylate. Although one of ordinary skill in the art will recognize that many different hydroxy-substituted alkyl(meth)acrylates including those listed above could be employed, the preferred hydroxy functional monomers for use in the resin of this invention are hydroxy-substituted (meth)acrylates, meaning alkyl acrylates and methacrylates having a total of 5 to 7 carbon atoms, i.e., esters of $C_2$-$C_3$ dihydric alcohols and acrylic or methacrylic acids.

Most preferably, the hydroxy-substituted alkyl(meth)acrylate monomer comprises a compound of the formula (I):

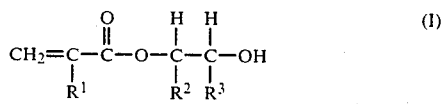

wherein $R^1$ is hydrogen or methyl and $R^2$ and $R^3$ are independently selected from the group consisting of hydrogen and alkyl of from 1 to 6 carbon atoms. Illustrative of these particularly suitable hydroxy-substituted alkyl(meth)acrylate monomers are 2-hydroxy ethyl methacrylate, 2-hydroxyethyl acrylate, 2-hydroxypropyl acrylate, 2-hydroxybutyl acrylate and 2-hydroxy-1-methylhexyl acrylate.

Among the non-hydroxy substituted alkyl(meth)acrylate monomers which may be employed are (meth)acrylates (as before, meaning esters of either acrylic or methacrylic acids) as well as mixtures of acrylates and vinyl hydrocarbons. Preferred non-hydroxy unsaturated monomers are esters of $C_1$-$C_{12}$ monohydric alcohols and acrylic or methacrylic acids, e.g., methylmethacrylate, ethylacrylate, butylacrylate, butyl-methacrylate, hexylacrylate, 2-ethylhexylacrylate, lauryl-methacrylate, glycidyl methacrylate, etc.

Particularly preferred non-hydroxy substituted monomers are compounds selected from the group consisting of monomers of the formula (II):

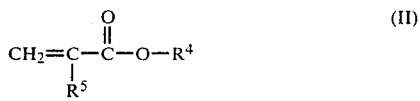

wherein $R^4$ is alkyl of from 1 to 6 carbon atoms and $R^5$ is hydrogen or methyl. Particularly preferred are butyl acrylate, butyl methacrylate and methyl methacrylate.

The total monomer mixture passed to the polymerization process step will generally comprise from about 5 to 30 wt.%, and preferably from about 10 to 20 wt.%, of the hydroxy-substituted alkyl(meth)acrylate and from about 5 to 95 wt.%, preferably from about 70 to 90 wt.% of the non-hydroxy substituted alkyl(meth)acrylate monomer, in addition to any optional monomers (discussed below). The non-hydroxy substituted (meth)acrylate will typically comprise a mixture of methyl methacrylate or methyl acrylate, which will be present in an amount of from about 5 to 30 wt.%, more preferably from about 10 to 25 wt.%, of the total monomer mixture, and up to about 60 wt.%, more preferably from about 25 to 45 wt.%, of the total monomer mixture of butyl acrylate, butyl methacrylate, or mixtures thereof.

Additional optional monomers which can be employed in the polymerization are monovinyl aromatic hydrocarbons containing from 8 to 12 carbon atoms, including styrene, alpha-methyl styrene, vinyl toluene, t-butyl styrene, chlorostyrene and the like. Where employed, these optional monovinyl hydrocarbons will be generally present in an amount of from about 5 to 30 wt.%, preferably from about 10 to 20 wt.% of the total monomer mixture.

In addition, other modifying monomers such as vinyl chloride, acrylonitrile, methacrylonitrile, vinyl acetate and acrylic acid may also be present. In the case of acrylic acid, when employed, this monomer will generally be present in an amount from about 2 to 5 wt.% of the total monomer mixture. The remaining above-mentioned modifying monomers will generally be present in an amount of from 3 to 10 wt.% of the monomer mixture, where employed.

The polymerization solvent of this invention comprises a mixture of methyl isobutyl ketone (MIBK) and an aromatic solvent. The MIBK component of the solvent will be generally present in an amount of from about 35 to 80 wt.%, preferably from about 50 to 75 wt.%, of the solvent mixture, and the aromatic solvent component will be present in an amount of from about 65 to 20 wt.%, preferably from about 50 to 25 wt.%, of the solvent mixture. The aromatic solvent component comprises at least one aromatic hydrocarbon solvent containing as a majority component an alkyl-substituted benzene in which the alkyl substituent (as disclosed) comprise a total of at least 2 carbon atoms when the benzene ring is mono-alkyl substituted and of at least 3 carbon atoms when the benzene ring is substituted by two or more alkyl groups. More preferably, the aromatic solvent component comprises an alkyl-substituted benzene of the formula (III):

wherein n is an integer of from 1 to 4, and X is in each instance in which it appears independently selected from the group consisting of straight and branched-chain alkyl of from 1 to 4 carbon atoms, with the proviso that when n is 1, X must contain at least 2 carbon atoms and with the further proviso that when n is 2 or greater, the X groups must contain a total of at least 3 carbon atoms, and mixtures of the foregoing aromatic compounds.

Illustrative of suitable alkyl-substituted benzene solvents for use in the solvent blends of this invention are ethyl benzene, isopropyl benzene, n-propyl benzene, 1-methyl-3-ethylbenzene, 1-methyl-4-ethylbenzene, 1,3,5-trimethylbenzene, 1-methyl-2-ethylbenzene, 1,2,4-trimethylbenzene, isobutylbenzene, sec-butylbenzene, 1-methyl-3-isopropylbenzene, 1-methyl-4-isopropylbenzene, 1,2,3-trimethylbenzene, 1-methyl-2-isopropylbenzene, 1,3-diethylbenzene, 1-methyl-3-n-propylbenzene, n-butylbenzene, 1,4-diethylbenzene, 1,3-dimethyl-5-ethylbenzene, 1,4-dimethyl-2-ethylbenzene, 1,3-dimethyl-4-ethylbenzene, 1,2-dimethyl-4-ethylbenzene, 1,2,4,5-tetramethylbenzene, 1,2,3,5-tetramethylbenzene and the like, and mixtures of the foregoing.

The aromatic solvent component can also contain up to about 50 wt.%, preferably less than about 40 wt.%, and more preferably up to about 25 wt.%, of other hydrocarbon solvents such as $C_6$ to $C_{14}$ aromatic solvents not satisfying the definition of formula III above, as well as $C_6$ to $C_{14}$ saturated aliphatic and cycloaliphatic hydrocarbons.

In preparing the polymers of this invention, the selected monomers, including the required hydroxy-substituted alkyl(meth)acrylate, and non-hydroxy substituted alkyl(meth)acrylate, together with any modifying or other monomers, may be mixed and reacted by conventional free radical initiated polymerization in such proportions as to obtain the copolymer desired, this reaction being effected in the presence of the solvent blend of this invention. A large number of free radical initiators are known to the art and are suitable for the purpose. These include: benzoyl peroxide; lauryl peroxide; t-butylhydroxy peroxide; acetylcyclohexylsulfonyl peroxide; diisobutyryl peroxide; di-(2-ethylhexyl)peroxydicarbonate; diisopropylperoxydicarbonate; t-butylperoxypivalate; decanoyl peroxide, azobis-(2-methylpropionitrile), 2-t-butylazo-2-cyanobutane, etc.

The total monomer mixture to be employed in preparing the polymers according to the process of this invention will generally comprise from about 40 to 80 wt.%, preferably from about 50 to 60 wt.%, of the total mass of monomers and solvent passed to the polymerization reaction vessel. Thus, the MIBK/alkyl-substituted benzene solvent blend of this invention will generally comprise from about 20 to 60 wt.%, preferably from about 40 to 50 wt.%, of the total mass of monomers and solvent passed to the polymerization vessel. The quantity of free radical initiators employed as catalyst in the reaction can also vary widely and will generally be present in an amount of from about 0.5 to 5 wt.% of the total monomer components charged to the reaction mixture.

The conditions of temperature and pressure for conducting the polymerization reaction can vary widely. Generally, the polymerization will be conducted at reflux temperature of the reaction mixture, which will generally range at from about 120° to 135° C. at atmospheric pressure. Pressures of from about 10 to 500 psig are entirely suitable, although higher or lower pressures can be employed. The polymerization reaction can be carried out in any of the conventional equipment employed by the industry for such reactions. Thus, the reaction vessel can comprise a stirred reactor in which an inert atmosphere (e.g., $N_2$, Ar) is maintained during the polymerization to avoid reactions with gaseous oxygen which compete, or interfere, with the desired polymerization reaction.

The polymerization process can be carried out batchwise, semi-continuously, or continuously. The monomers and solvent can be premixed or passed separately to the polymerization vessel alone, or in combination with the free radical initiators and other components.

The time for which the polymerization reaction is allowed to proceed can also vary widely and will generally range from about 0.5 to 10 hours, preferably from about 1 to 6 hours.

The acrylic resins produced by the process of this invention are characterized by number average molecular weights of from about 1,000 to about 6,000, and preferably from about 2,500 to about 4,500. These acrylic resins can then be employed in the formulation of coatings with or without the addition of other solvents. The components of such coating compositions formulated using these acrylic resins can be any of the conventional catalysts, antioxidants, UV absorbers and stabilizers, surface modifiers, wetting agents as well as pigments. These materials are conventional and a more complete description thereof is not necessary for a full understanding of this invention. For example, illustrative conventional UV absorbers and stabilizers are illustrated by those discussed in European Patent Application No. 29,594.

The coatings prepared by use of the acrylic resins of this invention can be applied to substrates, such as automobiles and the like, using conventional methods known to the art, such as roller coating, spray coating, electrostatic spray coating, dipping or brushing. Of course, the particular application technique will depend on the particular substrate to be coated and the environment in which the coating operation is to take place. A particularly preferred technique for applying the high solids compositions, particularly when applying the same to automobiles as top coats, is spray coating through the nozzle of a spray gun.

The process and compositions of this invention can be further illustrated by reference to the following examples, wherein parts are by weight unless otherwise indicated.

In the Examples, the MIBK/alkyl-substituted benzene solvent blends of this invention were formulated using AROMATIC 100 TM solvent (manufactured by Exxon Company USA) which comprised a narrow-cut aromatic solvent containing about 40 wt.% trimethyl benzenes, 35 wt.% methyl ethyl benzenes, 10 wt.% propyl and isopropyl benzenes, 3 wt.% ethyl dimethyl benzenes, 2 wt.% methyl (n- and iso-) propyl benzenes, 2 wt.% diethyl benzenes, <1 wt.% each of mono butyl benzenes and tetramethyl benzenes, 6 wt.% xylenes and minor amounts of ethyl benzene, $C_{10}$ and $C_{11}$ saturates and unknowns.

Solvent resistivities in the Examples were determined using a Beckman Conductivity Bridge Model RC-16C. Number average molecular weights ($M_n$) and weight average molecular weights ($M_w$) were found by gel permeation chromatography. Inherent viscosities ($\eta_{inh}$) were determined from the relation $$\eta_{inh} = \frac{\ln(\eta_{rel})}{C}$$

where C=grams of polymer per 100 ml. of solution and $\eta_{rel}$=[(viscosity of solution)÷(viscosity of solvent)]. (Solutions, for viscosity determinations, contained 1.5–1.7 grams of polymer per 100 ml. of solution.)

EXAMPLE 1

To a one liter flask equipped with a mechanical stirrer, two addition funnels and a reflux condenser was added 164 grams of methyl isobutyl ketone (MIBK) and 76 grams of AROMATIC 100 TM solvent (Exxon Company USA). One of the addition funnels (500 ml. capacity) contained:

|  | Grams | Wt. % |
| --- | --- | --- |
| Hydroxyethyl acrylate | 60 | 20 |
| Methyl methacrylate | 60 | 20 |
| Styrene | 30 | 10 |
| Butyl methacrylate | 150 | 50 |
|  | 300 | 100 |

The second addition funnel of 50 ml capacity contained 15 grams of azobis(isobutyronitrile) dissolved in 25 ml. of acetone. The liquids in the two addition funnels and in the reaction flask were kept under a nitrogen blanket (1 atm. $N_2$). The solvent blend in the reaction flask was heated to reflux temperature (124°–128° C.) and the contents of the two funnels were added slowly, with stirring over a period of 2 hours. Periodically, acetone was allowed to evaporate through the top of the condenser and was removed to maintain the selected reflux temperature. After completion of the addition, stirring and heating was continued for an additional one-half hour. Then 2 more grams of azobis(isobutyronitrile) dissolved in 10 ml. of acetone were added in small portions and stirring and heating was continued for 2 hours to complete the polymerization. The polymer solution thus prepared had an inherent viscosity ($\eta_{inh}$) of 0.082 and a solids content of 51.8 wt.%. The number average molecular weight, $M_n$=1660 and $M_w/M_n$=3.68. The solvent resistivity was 80 mega ohms.

COMPARATIVE EXAMPLE 1A

The procedure of Example 1 was repeated except that the solvent comprised methyl amyl ketone (240 grams). The reflux temperature in this run was about 146° C.

The resultant acrylic polymer had an inherent viscosity of 0.073, $M_n = 1,240$ and $M_w/M_n = 3.60$. The solvent resistivity was 22 mega ohms.

EXAMPLE 2

Following the procedure of Example 1, the following mixture was charged to the first dropping funnel:

|  | Wt. | Wt. % |
| --- | --- | --- |
| Hydroxyethyl acrylate | 60 | 20.0 |
| Methyl methacrylate | 60 | 20.0 |
| Styrene | 30 | 10.0 |
| Butyl acrylate | 142 | 47.3 |
| Acrylic acid | 8 | 2.7 |
|  | 300 | 100.0 |

The charge to the second addition funnel comprised 9 grams of azobis(isobutyronitrile) and 20 grams of acetone. The contents of these two funnels were then added dropwise with stirring over a period of 2 hours at refluxing conditions to the glass flask containing the selected solvent, which in this example comprised 164 grams of MIBK and 76 grams of AROMATIC 100 ™ solvent mixture. After addition of the contents of the two addition funnels, stirring was continued at reflux conditions for an additional one-half hour. Then, 2 grams of azobis(isobutyronitrile) in 10 ml. of acetone were added dropwise and reflux was continued for an additional 1.5 hours.

The acrylic resin thus produced was then recovered and analyzed, yielding the data set forth in Table I.

COMPARATIVE EXAMPLES 2A AND 2B

The procedure of Example 2 was repeated in a series of additional runs except that the solvent comprised 240 grams of methyl amyl ketone or 240 grams of methyl isobutyl ketone. The data thereby obtained are also set forth in Table I.

EXAMPLE 3

The procedure of Example 2 was repeated except that the initiator was t-butylazo-2-cyanobutane (9 grams) dissolved in 25 ml. MIBK. The reaction flask contained 139 grams MIBK and 76 grams AROMATIC 100 ™ solvent. The addition was completed in 3 hours with continuous heating and stirring, having a reflux temperature of 124°–128° C. As in Example 2, an additional 2 grams of t-butylazo-2-cyanobutane was added in small portions and the heating and stirring was continued for 2 hours. The acrylic polymer thus obtained had an inherent viscosity of 0.093, $M_n = 2,490$ and $M_w/M_n = 5.52$ (determined by GPC). The copolymer solution was also found to have a kinematic viscosity of about 215 cps.

EXAMPLE 4

Example 3 was repeated and the resultant polymer was found to have $\eta_{inh} = 0.089$, $M_n = 2,299$ and $M_w/M_n = 4.99$. The kinematic viscosity of the polymer solution was 219 cps.

EXAMPLE 5

The procedure of Example 3 was repeated except that the initiator (15 grams of t-butylazo-2-cyanobutane) was mixed with the monomer blend in the addition funnel. The reaction flask contained 164 grams of MIBK and 76 grams of AROMATIC 100 ™ solvent. The final copolymer was found to have $\eta_{inh} = 0.089$, $M_n = 2,195$ and $M_w/M_n = 4.86$.

COMPARATIVE EXAMPLE 6

The procedure of Example 2 was repeated except that the initiator, azobis(isobutyronitrile) was dissolved in 25 ml. of acetone and then mixed with the monomer blend to facilitate the addition of the initiator and except that the solvent charged to the reaction flask comprised 164 grams MIBK and 78 grams of toluene. A reflux temperature was maintained during the run of 120° C. The resultant polymer was found to have $\eta_{inh} = 0.098$, $M_n = 3,519$ and $M_w/M_n = 91.37$. The very wide molecular weight distribution (very high $M_w/M_n$) renders this copolymer product unsuitable for acrylic higher solids coatings.

COMPARATIVE EXAMPLE 7

The procedure of Example 2 was repeated except that 240 grams of xylene was charged to the reaction flask instead of the MIBK/AROMATIC 100 ™ solvent. The resultant acrylic copolymer solution was found to have an inherent viscosity of 0.084 and a kinematic viscosity of 692 cps, which makes the copolymer solution unacceptable for formulation of higher solids coatings.

COMPARATIVE EXAMPLE 8

The procedure of Example 7 was repeated except that 240 grams of toluene was employed as the polymerization solvent in the reaction flask. The polymer solution which was thus obtained was found to have an inherent viscosity of 0.104 and a kinematic viscosity of 690 cps which is unacceptable for the formulation of higher solids coatings.

EXAMPLE 9

Following the procedure of Example 1, the following acrylic monomers were charged in the large addition funnel, together with 15 grams t-butylazo-2-cyanobutane as initiator:

TABLE I

| Example No. | Solvent System | Solvent Resistivity (mega ohms) | Reflux Temp. (°C.) | Acrylic Copolymer | | | |
| --- | --- | --- | --- | --- | --- | --- | --- |
|  |  |  |  | $M_n$ | $M_w/M_n$ | $\eta_{inh}$ | kin. vis.* |
| 2 | MIBK/Aromatic 100 Solvent | 80 | 128 | 2,244 | 3.87 | 0.102 | ~215 |
| 2-A | MAK | 22 | 146 | 2,280 | 5.89 | 0.092 | 209 |
| 2-B | MIBK | 28 | 124 | 2,818 | 8.84 | 0.110 | — |

*kinematic viscosity (cps)

|  | Grams | Wt. % |
| --- | --- | --- |
| Hydroxyethyl acrylate | 60 | 20.0 |
| Methyl methacrylate | 80 | 26.7 |
| Styrene | 30 | 10.0 |
| Butyl methacrylate | 30 | 10.0 |
| Butyl acrylate | 100 | 33.3 |
|  | 300 | 100.0 |

The monomer blend was added dropwise with constant stirring to the reaction flask containing 164 grams of MIBK and 76 grams of AROMATIC 100 ™ solvent, at reflux conditions. As before, the liquids were protected with an atmosphere of nitrogen. The addition was completed in 2 hours, and the stirring and heating was continued for an additional one-half hour. Then, 2 grams of t-butylazo-2-cyanobutane initiator were added in small portions, and stirring and heating was continued for another 2 hours. The resultant polymer had an inherent viscosity of 0.080. $M_n = 2,240$ and $M_w/M_n = 2.59$. The kinematic viscosity of the polymer solution was in the range of 200-240 cps, as determined by visually observing the ease of flow of the polymer solution when poured. The flowability of the polymer solution was observed to be comparable to the polymer solution obtained in Example 4.

The MIBK/alkyl-substituted benzene polymerization-solvent systems of this invention have been found to produce acrylic polymer solutions, having kinematic viscosities of less than about 400 cps, and preferably less than about 300 cps, which are particularly suited for use in formulating high solids coatings.

It will be obvious that various changes and modifications may be made without departing from the invention and it is intended, therefore, that all matter contained in the foregoing description shall be interpreted as illustrative only and not limitative of the invention.

What is claimed is:

1. An improved process for forming acrylic copolymer resins which comprises effecting a polymerization reaction by contacting under polymerization conditions, a monomer mixture comprising from about 5 to 30 wt.%, based on said monomer mixture, of at least one hydroxy-substituted alkyl(meth)acrylate monomer and from about 5 to 95 wt.%, based on said monomer mixture, of at least one non-hydroxy substituted alkyl(meth)acrylate monomer, in the presence of a free radical initiator and a solvent therefor, said solvent comprising a blend of from about 35 to 80 wt.%, methyl isobutyl ketone and, as the balance thereof, at least one alkyl-substituted benzene solvent comprising at least one aromatic compound of the formula:

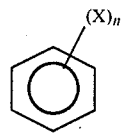

wherein n is an integer of from 1 to 4, and X is in each instance in which it appears independently selected from the group consisting of straight and branched-chain alkyl of from 1 to 4 carbon atoms, with the proviso that when n is 1, the X groups must contain a total of at least 2 carbon atoms and with the further proviso that when n is 2 or higher, the X groups must contain a total of at least 3 carbon atoms, and mixtures of the foregoing aromatic compounds, said hydroxy substituted alkyl(meth)acrylate monomer and said non-hydroxy substituted alkyl(meth)acrylate monomer comprising at least about 60 wt.% of said monomer mixture.

2. The process according to claim 1 wherein said hydroxy-substituted alkyl(meth)acrylate monomer comprises at least one monomer of the formula:

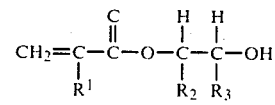

wherein $R^1$ is hydrogen or methyl and $R^2$ and $R^3$ are independently selected from the group consisting of hydrogen and alkyl of from 1 to 6 carbon atoms.

3. The process according to claim 1 wherein said non-hydroxy substituted alkyl(meth)acrylate monomer comprises at least one monomer of the formula:

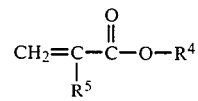

wherein $R^4$ is alkyl of from 1 to 6 carbon atoms and $R^5$ is hydrogen or methyl.

4. The process according to claim 1 wherein said methyl isobutyl ketone/alkyl-substituted benzene solvent blend is employed in an amount from about 20 to 60 by weight of the reaction mass in said polymerization reaction.

5. The process according to claim 1 wherein said polymerization reaction is effected under refluxing conditions for a time of from about 0.5 to 10 hours.

6. The process according to claim 1 wherein said acrylic co-polymer resins are characterized by a number average molecular weight of from about 1,000 to about 6,000.

7. The process according to claim 1 wherein said monomer mixture additionally comprises from about 5 to 30 wt.%, based on said monomer mixture, of at least one monovinyl aromatic hydrocarbon containing from 8 to 12 carbon atoms per molecule.

8. The process according to claim 7 wherein said monovinyl aromatic hydrocarbon comprises a member selected from the group consisting of styrene, alpha-methyl styrene, vinyl toluene, t-butyl styrene and chlorostyrene.

9. An improved process for forming acrylic copolymer resins which comprises effecting a polymerization reaction by contacting, under polymerizing conditions:

(1) a monomer mixture comprising:

(a) from 10 to 20 wt.%, based on said monomer mixture, of at least one hydroxy-substituted alkyl(meth)acrylate monomer of the formula:

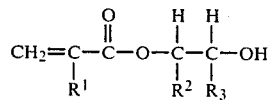

wherein $R^1$ is hydrogen or methyl and $R^2$ and $R^3$ are independently selected from the group consisting of hydrogen and alkyl of from 1 to 6 carbon atoms, and (b) from about 70 to 90 wt.%, based on said monomer mixture, of at least one non-hydroxy substituted alkyl(meth)acrylate monomer of the formula:

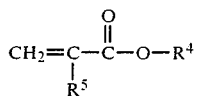

wherein $R^4$ is alkyl of from 1 to 6 carbon atoms and $R^5$ is hydrogen or methyl;

(2) a free radical polymerization initiator; and (3) a solvent therefor, said solvent comprising a blend of from about 35 to 80 wt.% of methyl isobutyl ketone and, as the balance thereof, at least one alkyl-substituted benzene solvent of the formula:

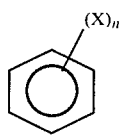

wherein n is an integer from 1 to 4, and X is in each instance in which it appears independently selected from the group consisting of straight and branched-chain alkyl of from 1 to 4 carbon atoms, with the proviso that when n is 1, the X groups must contain a total of at least 2 carbon atoms and with the further proviso that when n is 2 or higher, the X groups must contain a total of at least 3 carbon atoms, and mixtures of the foregoing aromatic compounds.

10. The process according to claim 9 wherein said methyl isobutyl ketone/alkyl-substituted benzene solvent blend is employed in an amount of from about 20 to 60 by weight of the total mass of monomers and solvent charged to said polymerization reaction.

11. The process according to claim 9 wherein said monomer mixture additionally comprises from about 10 to 20 wt.%, based on said monomer mixture, of at least one monovinyl aromatic hydrocarbon containing from 8 to 12 carbon atoms per molecule.

12. The process according to claim 11 wherein said monovinyl aromatic hydrocarbon comprises a member selected from the group consisting of styrene, alpha-methyl styrene, vinyl toluene, t-butyl styrene and chlorostyrene.

* * * * *